US012732954B2

(12) United States Patent
Fouda et al.

(10) Patent No.: US 12,732,954 B2
(45) Date of Patent: Sep. 8, 2026

(54) VERTICAL POSITIONING ERROR REDUCTION USEFUL TO SYSTEMS SUCH AS IIoT

(71) Applicants: Nokia Technologies Oy, Espoo (FI); NOKIA OF AMERICA CORPORATION, Sunnyvale, CA (US)

(72) Inventors: Abdurrahman Fouda, Evanston, IL (US); Ryan Keating, Chicago, IL (US); Hyun-su Cha, Oak Park, IL (US)

(73) Assignee: Nokia Technologies Oy, Espoo (FI)

( * ) Notice: Subject to any disclaimer, the term of this patent is extended or adjusted under 35 U.S.C. 154(b) by 219 days.

(21) Appl. No.: 18/716,845

(22) PCT Filed: Dec. 6, 2021

(86) PCT No.: PCT/US2021/061945
§ 371 (c)(1),
(2) Date: Jun. 5, 2024

(87) PCT Pub. No.: WO2023/107087
PCT Pub. Date: Jun. 15, 2023

(65) Prior Publication Data

US 2025/0039839 A1 Jan. 30, 2025

(51) Int. Cl.
*H04W 64/00* (2009.01)
*H04L 5/00* (2006.01)
*H04W 84/06* (2009.01)

(52) U.S. Cl.
CPC ......... *H04W 64/006* (2013.01); *H04L 5/0051* (2013.01); *H04W 84/06* (2013.01)

(58) Field of Classification Search
CPC ... H04W 64/006; H04W 4/026; H04W 4/027; H04W 4/029; H04W 84/06;
(Continued)

(56) References Cited

U.S. PATENT DOCUMENTS 11,363,418 B2 * 6/2022 Rydén ................. H04W 64/006
11,595,934 B2 * 2/2023 Chakraborty ........... H04W 4/33
(Continued)

FOREIGN PATENT DOCUMENTS

AU 2021202785 A1 * 5/2021 ........... G01S 5/0215
CA 3079934 A1 * 6/2019 ............ H04W 4/029
(Continued)

OTHER PUBLICATIONS

Beuchat et al, Enabling Optimization-Based Localization for IoT Devices, IEEE Internet Of Things Journal, Jun. 2019 (Year: 2019).*
(Continued)

*Primary Examiner* — Charles R Craver
(74) *Attorney, Agent, or Firm* — Barta Jones, PLLC

(57) ABSTRACT

A network device determines localization constraint(s) for an expected vertical range over which a UE may be positioned. The network device estimates vertical position of the UE. The network device compares the estimated vertical position with the localization constraint(s). The network device performs different actions depending on whether the estimated vertical position is within or outside the localization constraint(s). The network device may be the UE 110, a location server (e.g., LMF), or an LMC as implemented by the RAN node.

20 Claims, 7 Drawing Sheets

(58) Field of Classification Search
CPC . H04L 5/0051; G01S 5/0269; G01S 5/02695; G01S 5/0295; G01S 5/0258
See application file for complete search history.

(56) References Cited

U.S. PATENT DOCUMENTS

| | | | | |
|---|---|---|---|---|
| 11,979,851 | B2 * | 5/2024 | Yasini | G01S 11/10 |
| 12,082,091 | B1 * | 9/2024 | Xiao | H04W 4/029 |
| 2021/0127347 | A1 * | 4/2021 | Akkarakaran | G01S 5/02695 |
| 2022/0070712 | A1 * | 3/2022 | Bao | G01S 5/0036 |
| 2024/0302482 | A1 * | 9/2024 | Saha | G01S 5/10 |
| 2025/0175928 | A1 * | 5/2025 | Reddy | G01S 5/0269 |

FOREIGN PATENT DOCUMENTS

| | | | | |
|---|---|---|---|---|
| CA | 3049067 | A1 * | 1/2020 | H04W 8/005 |
| WO | WO-2007100520 | A1 * | 9/2007 | G01S 5/0295 |
| WO | WO-2012042315 | A1 * | 4/2012 | H04W 4/80 |
| WO | WO-2019153600 | A1 * | 8/2019 | H04W 64/00 |

OTHER PUBLICATIONS

Zhang et al, On the Way from Lightweight to Powerful Intelligence: A Heterogeneous Multi-Robot Social System with IoT Devices, 2022 IEEE 18th International Conference on Automation Science and Engineering (CASE) (Year: 2022).*

* cited by examiner

FIG. 5(a) Horizontal error

FIG. 5(b) Vertical error

FIG. 6

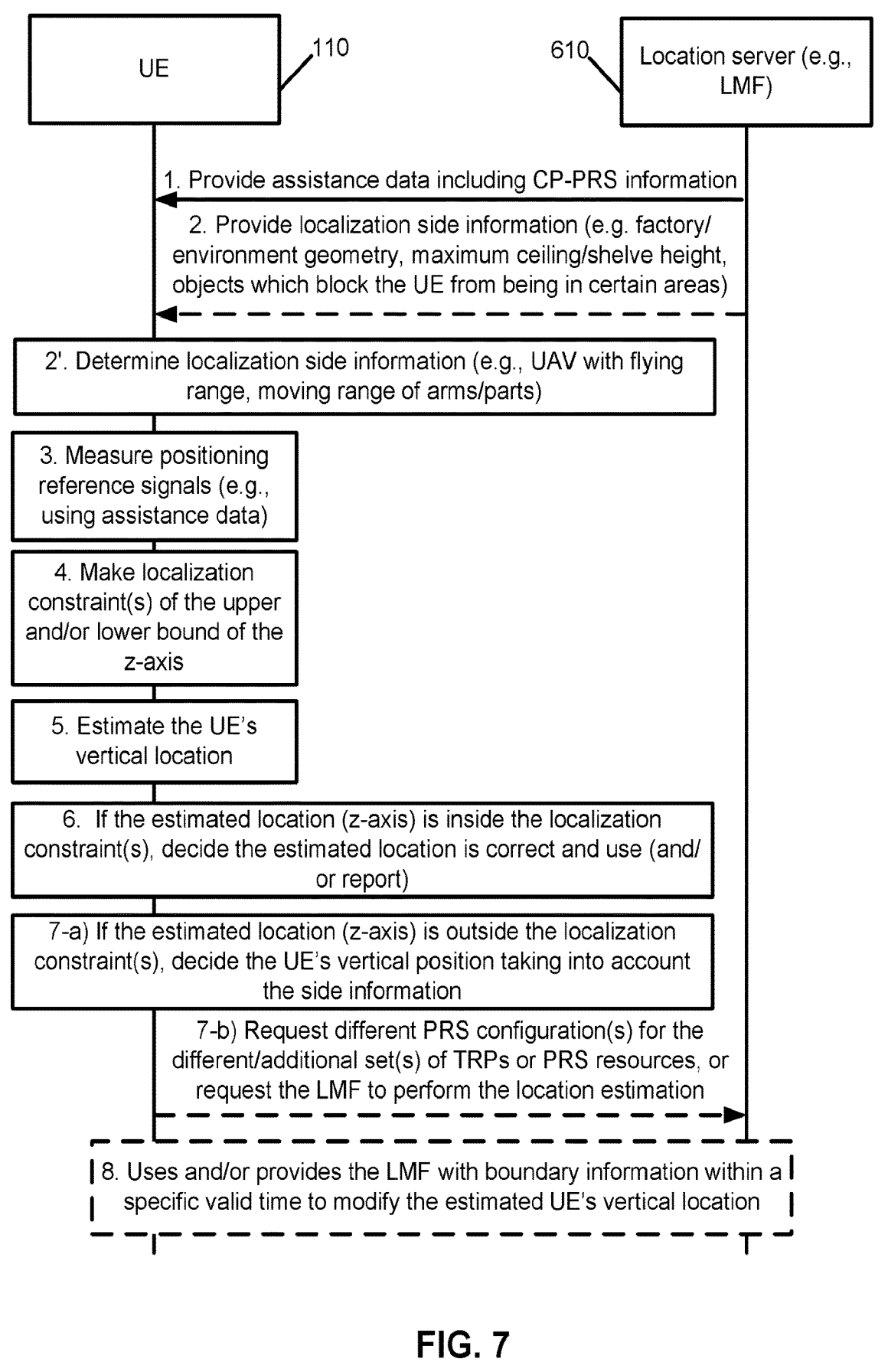

UE
110
610
Location server (e.g., LMF)

1. Provide assistance data including CP-PRS information

2. Provide localization side information (e.g. factory/ environment geometry, maximum ceiling/shelve height, objects which block the UE from being in certain areas)

2'. Determine localization side information (e.g., UAV with flying range, moving range of arms/parts)

3. Measure positioning reference signals (e.g., using assistance data)

4. Make localization constraint(s) of the upper and/or lower bound of the z-axis 5. Estimate the UE's vertical location 6. If the estimated location (z-axis) is inside the localization constraint(s), decide the estimated location is correct and use (and/ or report)

7-a) If the estimated location (z-axis) is outside the localization constraint(s), decide the UE's vertical position taking into account the side information 7-b) Request different PRS configuration(s) for the different/additional set(s) of TRPs or PRS resources, or request the LMF to perform the location estimation 8. Uses and/or provides the LMF with boundary information within a specific valid time to modify the estimated UE's vertical location

FIG. 7

VERTICAL POSITIONING ERROR REDUCTION USEFUL TO SYSTEMS SUCH AS IIoT

TECHNICAL FIELD

Exemplary embodiments herein relate generally to wireless communications and, more specifically, relate to determining positioning of a user equipment using at least a wireless network.

BACKGROUND

It can be beneficial at times to determine location of a user equipment (UE, a wireless, typically mobile device) using a wireless network. For instance, for emergency calls requiring a response, since a user equipment can be in any location, determining the location of the user equipment is helpful for the response. UEs are also being placed on robots or other movable devices, and determining the location of these devices is important. Consider robots in a manufacturing environment, for instance, where it is beneficial to control their locations to a high specificity.

A Rel-16 (release-16) work item was conducted in 3GPP for native positioning support in New Radio (NR). See Intel Corporation, Ericsson, RP-190752, "New WID: NR Positioning Support", 3GPP TSG RAN Meeting #83, Shenzhen, China, Mar. 18-21, 2019. As the result of that work, the following positioning solutions are specified for NR Rel-16:

Downlink Time Difference of Arrival (DL-TDOA);
Uplink Time Difference of Arrival (UL-TDOA);
Downlink Angle of Departure (DL-AoD);
Uplink Angle of Arrival (UL-AoA);
NR positioning: Enhanced Cell Identity (ECID); and
Multi-cell Round Trip Time (Multi-RTT).

In release 17, there will be further work on NR positioning with the main target being the Industrial Internet of Things (IIoT) use cases. See Qualcomm Incorporated, RP-193237, "New SID for Positioning Enhancements", 3GPP TSG RAN Meeting #86, Sitges, Spain, Dec. 9-12, 2019. It is expected that even more enhancements will be needed during Rel-18. So far in Rel-16/17, NR positioning has relied on angle, timing and power measurements. It is expected that Rel-18 will include a new NR positioning technique called carrier-phase positioning. See Nokia, Nokia Shanghai Bell, RWS-210117, "Enhanced positioning accuracy for Rel-18", RAN Rel-18 Workshop, 28 Jun.-2 Jul. 2021. The accuracy requirements for both horizontal and vertical positioning are therefore expected to continue to become stricter.

BRIEF SUMMARY

This section is intended to include examples and is not intended to be limiting.

In an exemplary embodiment, a method is disclosed that includes determining one or more localization constraints for an expected vertical range over which a user equipment may be positioned, and estimating vertical position of the user equipment. The method includes comparing the estimated vertical position with the one or more localization constraints, and performing different actions depending on whether the estimated vertical position is within or outside the one or more localization constraints.

An additional exemplary embodiment includes a computer program, comprising code for performing the method of the previous paragraph, when the computer program is run on a processor. The computer program according to this paragraph, wherein the computer program is a computer program product comprising a computer-readable medium bearing computer program code embodied therein for use with a computer. Another example is the computer program according to this paragraph, wherein the program is directly loadable into an internal memory of the computer.

An exemplary apparatus includes one or more processors and one or more memories including computer program code. The one or more memories and the computer program code are configured to, with the one or more processors, cause the apparatus at least to: determine one or more localization constraints for an expected vertical range over which a user equipment may be positioned; estimate vertical position of the user equipment; compare the estimated vertical position with the one or more localization constraints; and perform different actions depending on whether the estimated vertical position is within or outside the one or more localization constraints.

An exemplary computer program product includes a computer-readable storage medium bearing computer program code embodied therein for use with a computer. The computer program code includes: code for determining one or more localization constraints for an expected vertical range over which a user equipment may be positioned; code for estimating vertical position of the user equipment; code for comparing the estimated vertical position with the one or more localization constraints; and code for performing different actions depending on whether the estimated vertical position is within or outside the one or more localization constraints.

In another exemplary embodiment, an apparatus comprises means for performing: determining one or more localization constraints for an expected vertical range over which a user equipment may be positioned; estimating vertical position of the user equipment; comparing the estimated vertical position with the one or more localization constraints; and performing different actions depending on whether the estimated vertical position is within or outside the one or more localization constraints.

BRIEF DESCRIPTION OF THE DRAWINGS

In the attached Drawing Figures:

FIGS. 6 and 7 are logic flow diagrams for vertical positioning error reduction in, e.g., IIoT;

DETAILED DESCRIPTION OF THE DRAWINGS

Figure 1:
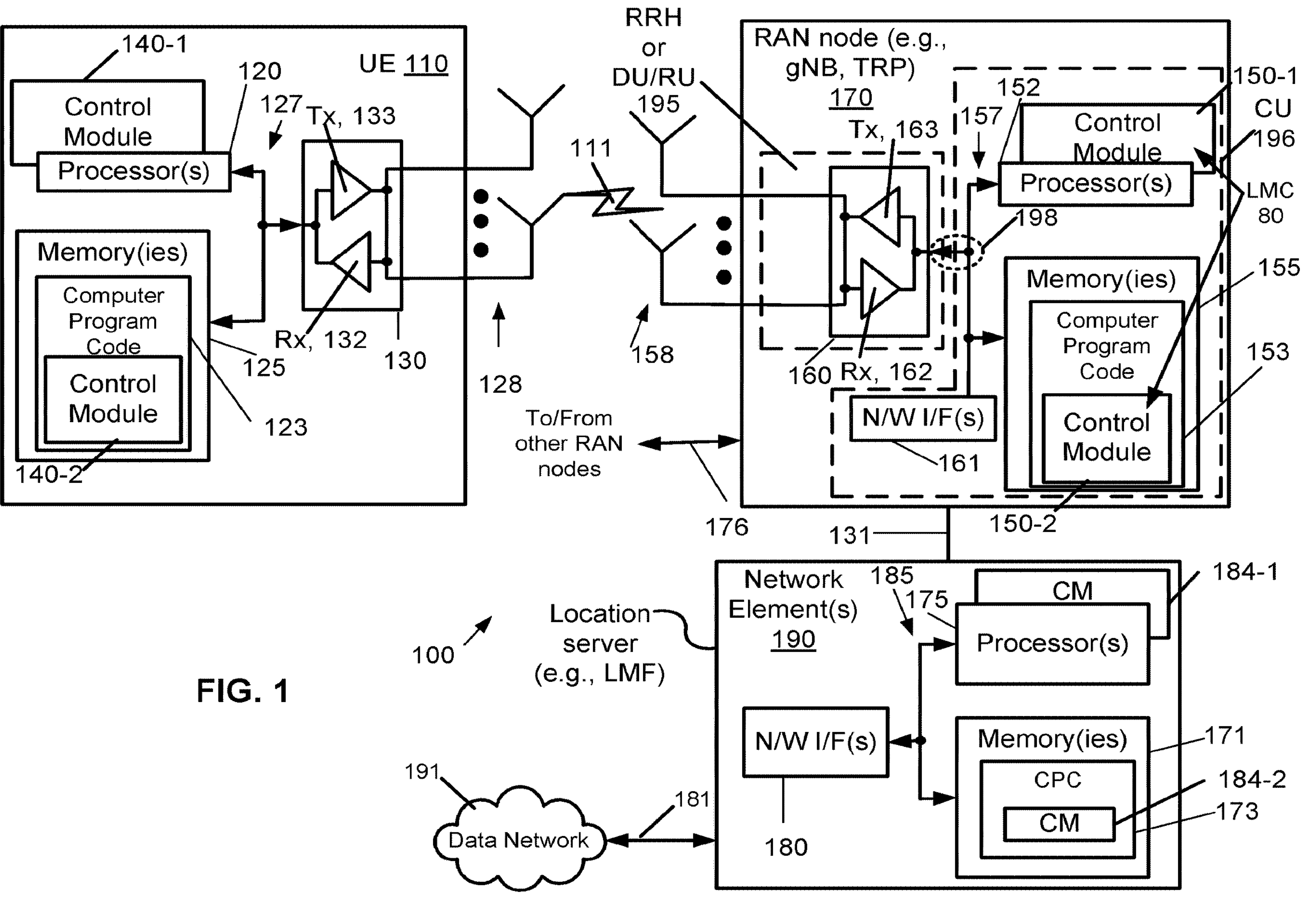
FIG. 1 is a block diagram of one possible and non-limiting exemplary system in which the exemplary embodiments may be practiced.

Abbreviations that may be found in the specification and/or the drawing figures are defined below, at the end of the detailed description section.

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

When more than one drawing reference numeral, word, or acronym is used within this description with "/", and in general as used within this description, the "/" may be interpreted as either "or", "and", or "both".

The exemplary embodiments herein describe techniques for vertical positioning error reduction in IIoT. Additional description of these techniques is presented after a system into which the exemplary embodiments may be used is described.

Turning to FIG. 1, this figure shows a block diagram of one possible and non-limiting exemplary system in which the exemplary embodiments may be practiced. A user equipment (UE) 110, radio access network (RAN) node 170, and network element(s) 190 are illustrated. In examples herein, one network element 190 may be a location server such as a location management function (LMF).

In FIG. 1, a user equipment (UE) 110 is in wireless communication with a wireless network 100. A UE is a wireless, typically mobile device that can access a wireless network. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 includes a control module 140, comprising one of or both parts 140-1 and/or 140-2, which may be implemented in a number of ways. The control module 140 may be implemented in hardware as control module 140-1, such as being implemented as part of the one or more processors 120. The control module 140-1 may be implemented also as an integrated circuit or through other hardware such as a programmable gate array. In another example, the control module 140 may be implemented as control module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with RAN node 170 via a wireless link 111.

The RAN node 170 is a base station that provides access by wireless devices such as the UE 110 to the wireless network 100. The RAN node 170 may be, for instance, a base station for 5G, also called New Radio (NR). In 5G, the RAN node 170 may be a NG-RAN node, which is defined as either a gNB or an ng-eNB. A gNB is a node providing NR user plane and control plane protocol terminations towards the UE, and connected via the NG interface to a 5GC (e.g., the network element(s) 190). The ng-eNB is a node providing E-UTRA user plane and control plane protocol terminations towards the UE, and connected via the NG interface to the 5GC. The NG-RAN node may include multiple gNBs, which may also include a central unit (CU) (gNB-CU) 196 and distributed unit(s) (DUs) (gNB-DUs), of which DU 195 is shown. Note that the DU may include or be coupled to and control a radio unit (RU). The gNB-CU is a logical node hosting RRC, SDAP and PDCP protocols of the gNB or RRC and PDCP protocols of the en-gNB that controls the operation of one or more gNB-DUs. The gNB-CU terminates the F1 interface connected with the gNB-DU. The F1 interface is illustrated as reference 198, although reference 198 also illustrates a link between remote elements of the RAN node 170 and centralized elements of the RAN node 170, such as between the gNB-CU 196 and the gNB-DU 195. The gNB-DU is a logical node hosting RLC, MAC and PHY layers of the gNB or en-gNB, and its operation is partly controlled by gNB-CU. One gNB-CU supports one or multiple cells. One cell is supported by one gNB-DU. The gNB-DU terminates the F1 interface 198 connected with the gNB-CU. Note that the DU 195 is considered to include the transceiver 160, e.g., as part of an RU, but some examples of this may have the transceiver 160 as part of a separate RU, e.g., under control of and connected to the DU 195. The RAN node 170 may also be an eNB (evolved NodeB) base station, for LTE (long term evolution), or any other suitable base station. While emphasis herein is placed on gNBs and eNBs, other base stations may be used such as TRPs (transmission-reception points).

The RAN node 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The CU 196 may include the processor(s) 152, memories 155, and network interfaces 161. Note that the DU 195 may also contain its own memory/memories and processor(s), and/or other hardware, but these are not shown.

The RAN node 170 includes a control module 150, comprising one of or both parts 150-1 and/or 150-2, which may be implemented in a number of ways. The control module 150 may be implemented in hardware as control module 150-1, such as being implemented as part of the one or more processors 152. The control module 150-1 may be implemented also as an integrated circuit or through other hardware such as a programmable gate array. In another example, the control module 150 may be implemented as control module 150-2, which is implemented as computer program code 153 and is executed by the one or more processors 152. For instance, the one or more memories 155 and the computer program code 153 are configured to, with the one or more processors 152, cause the RAN node 170 to perform one or more of the operations as described herein. Note that the functionality of the control module 150 may be distributed, such as being distributed between the DU 195 and the CU 196, or be implemented solely in the DU 195.

The one or more network interfaces 161 communicate over a network such as via the links 176 and 131. Two or more RAN nodes 170 communicate using, e.g., link 176. The link 176 may be wired or wireless or both and may implement, e.g., an Xn interface for 5G, an X2 interface for LTE, or other suitable interface for other standards.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195 for LTE or a distributed unit (DU) 195 for gNB implementation for 5G, with the other elements of the RAN node 170 possibly being physically in a different location from the RRH/DU, and the one or more buses 157 could be implemented in part as, e.g., fiber optic cable or other suitable network connection to connect the other elements (e.g., a central unit (CU), gNB-CU) of the RAN node 170 to the RRH/DU 195. Reference 198 also indicates those suitable network link(s).

The wireless network 100 may include a network element or elements 190 that may include core network functionality, and which provides connectivity via a link or links 181 with a data network 191, such as a telephone network and/or a data communications network (e.g., the Internet). Such core network functionality for 5G may include access and mobility management function(s) (AMF(s)) and/or user plane functions (UPF(s)) and/or session management function(s) (SMF(s)). Such core network functionality for LTE may include MME (Mobility Management Entity)/SGW (Serving Gateway) functionality. Examples herein include a location server, such as an LMF. These are merely exemplary functions that may be supported by the network element(s) 190, and note that both 5G and LTE functions might be supported. The RAN node 170 is coupled via a link 131 to a network element 190. The link 131 may be implemented as, e.g., an NG interface for 5G, or an SI interface for LTE, or other suitable interface for other standards.

The network element 190 includes one or more processors 175, one or more memories 171, and one or more network interfaces (N/W I/F(s)) 180, interconnected through one or more buses 185. The one or more memories 171 include computer program code (CPC) 173 and potentially control module 184-2. The network element 190 includes a control module (CM) 184, comprising one of or both parts 184-1 and/or 184-2, which may be implemented in a number of ways. The control module 184 may be implemented in hardware as control module 184-1, such as being implemented as part of the one or more processors 175. The control module 184-1 may be implemented also as an integrated circuit or through other hardware such as a programmable gate array. In another example, the control module 184 may be implemented as control module 184-2, which is implemented as computer program code 173 and is executed by the one or more processors 175. For instance, the one or more memories 171 and the computer program code 173 are configured to, with the one or more processors 175, cause the network element 190 to perform one or more of the operations as described herein.

The main emphasis placed herein is a location server 190, which implements an LMF, as an element in a core network, e.g., 5 GC. However, an LMF may be also be functionality implemented in an element 190 that is not technically a "location server". Further, a location management component (LMC) 80 could be implemented as part of the control module 150 in the RAN node 170. The LMC 80 can be considered to be an LMF inside the RAN node 170, for instance. Other examples are possible, too.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor-based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general-purpose computers, special purpose computers, microprocessors, digital signal processors (DSPs) and processors based on a multi-core processor architecture, as non-limiting examples. The processors 120, 152, and 175 may be means for performing functions, such as controlling the UE 110, RAN node 170, network element 190, and other functions as described herein.

In general, the various embodiments of the user equipment 110 can include, but are not limited to, cellular telephones such as smart phones, tablets, personal digital assistants (PDAs) having wireless communication capabilities, portable computers having wireless communication capabilities, vehicles with a modem device for wireless V2X (vehicle-to-everything) communication, image capture devices such as digital cameras having wireless communication capabilities, gaming devices having wireless communication capabilities, music storage and playback appliances having wireless communication capabilities, Internet appliances (including Internet of Things, IoT, devices) permitting wireless Internet access and possibly browsing, IoT devices with sensors and/or actuators for automation applications with wireless communication tablets with wireless communication capabilities, as well as portable units or terminals that incorporate combinations of such functions.

Having thus introduced one suitable but non-limiting technical context for the practice of the exemplary embodiments, the exemplary embodiments will now be described with greater specificity.

As previously stated above, it is expected that Rel-18 will include a new NR positioning technique called carrier-phase positioning. The accuracy requirements for both horizontal and vertical positioning are therefore expected to continue to become stricter.

Currently the highest performing positioning technique for outdoor applications is real-time kinematic (RTK) global navigation satellite system (GNSS). RTK-GNSS uses phase measurements along with corrections data in order to achieve 10-cm accuracy in practice. Measuring the carrier-phase provides an estimate of the distance between the transmitter and the receiver. The issues with RTK-GNSS are related to cost and this technique only works in outdoor environments with good line-of-sight conditions to multiple satellites.

Figure 2:
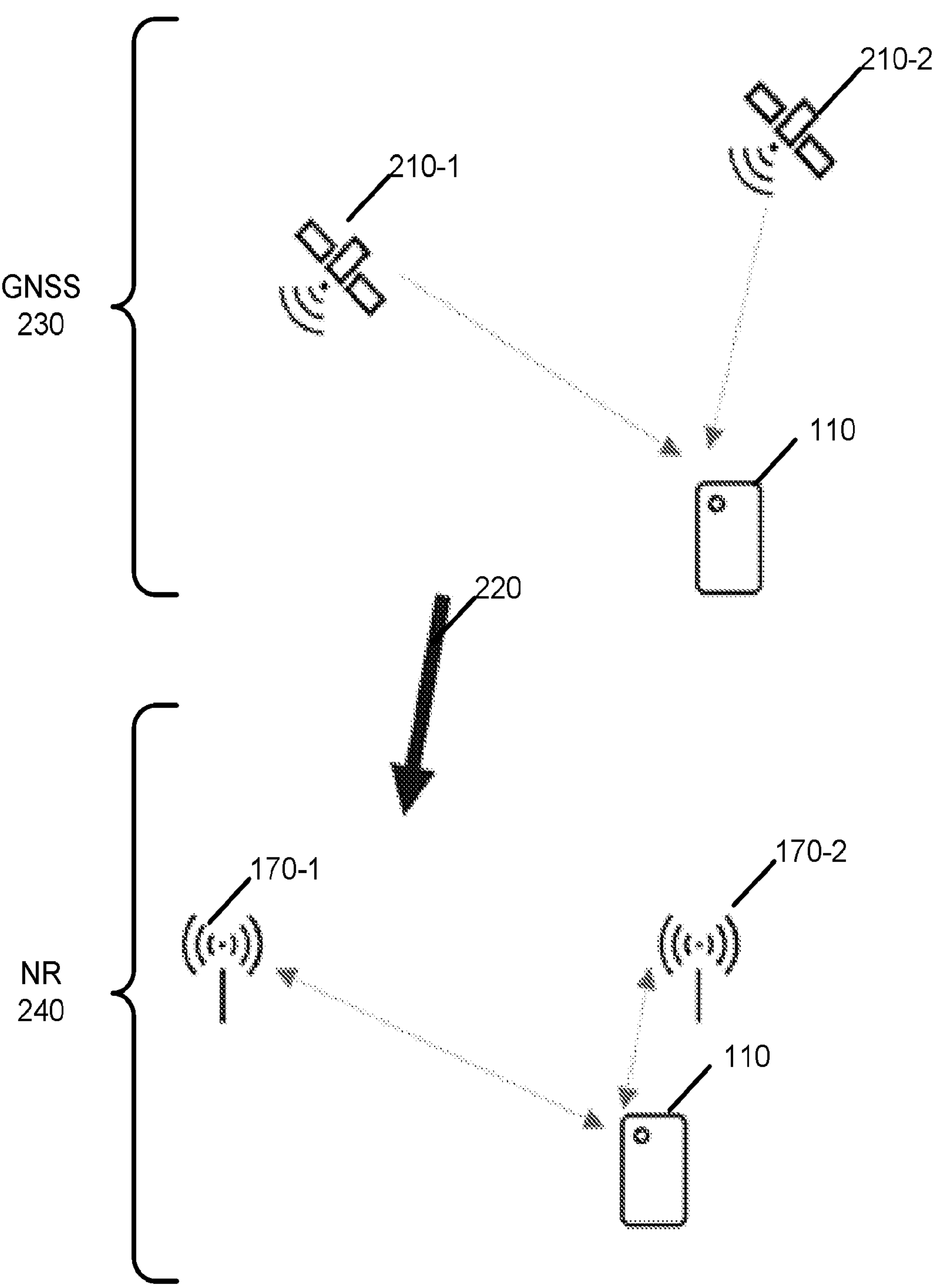
FIG. 2 illustrates a difference in taking an RTK-GNSS concept to NR.

In RTK-GNSS, the device (e.g., the UE 110) measures signals from the satellites then calculates its location. In NR, one of the major differences is that the devices can also send signals to the network nodes (e.g., gNBs 170), which can measure the carrier-phase and report the phase to a location server. FIG. 2 shows the difference in taking an RTK-GNSS concept to NR.

In FIG. 2, the UE 110 receives signals from two satellites 210-1, 210-2 for GNSS 230. The arrow 220 indicates that this is to be combined with the NR 240 system (e.g., a wireless network 100), where the UE 110 communicates with two gNBs 170-1, 170-2. Both signaling systems are to be combined for RTK-GNSS.

Figure 3:
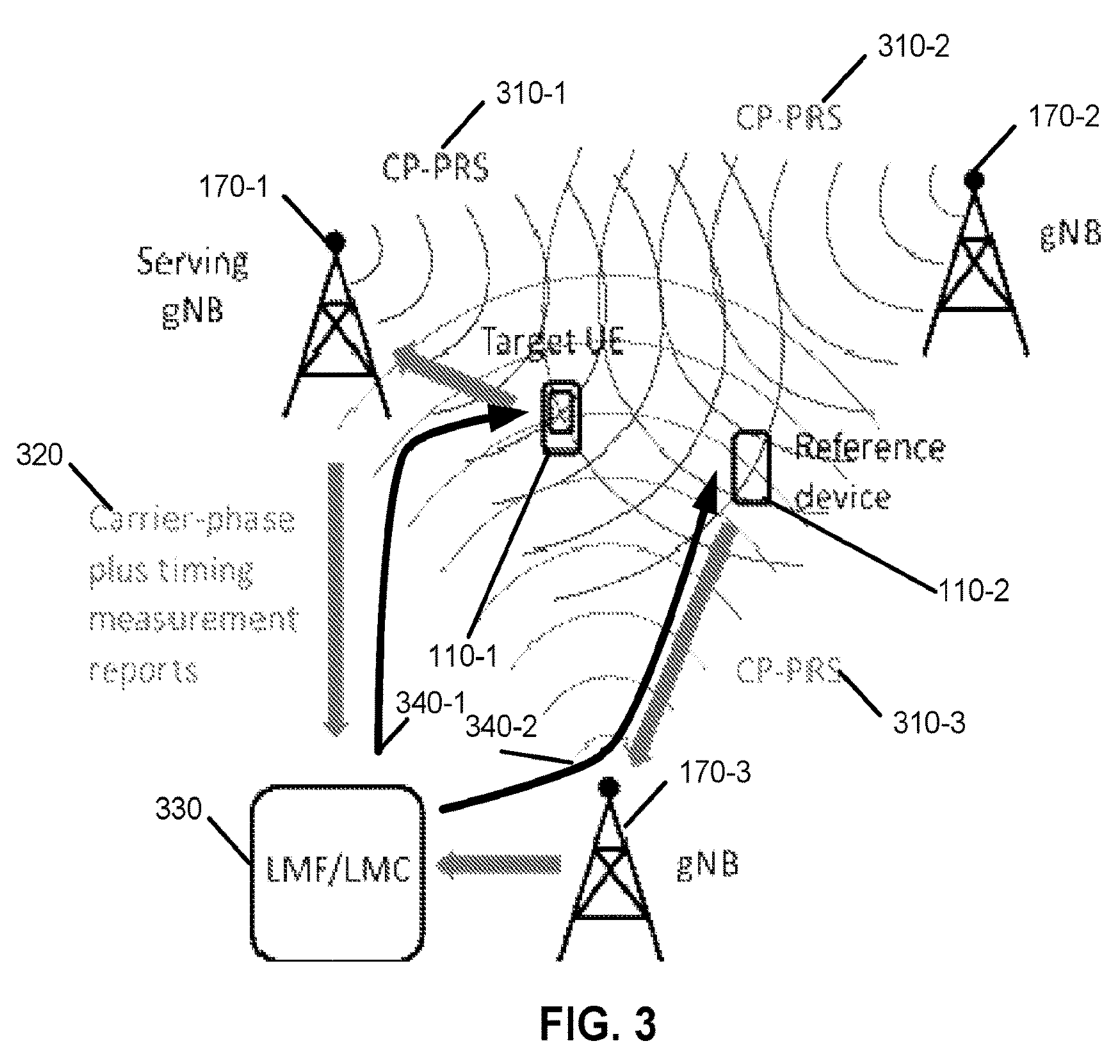
FIG. 3 illustrates one possible expected system setup for carrier-phase positioning.

Issues with this include the following. Carrier-phase positioning in NR is expected to involve the transmission of carrier-phase-positioning reference signals (CP-PRSs). CP-PRS may be the same as the existing Rel-16/17 PRS or SRS for positioning or it may be redesigned specifically for the NR carrier-phase technique. For simplicity, this is referred to herein as reference signal CP-PRS. The CP-PRS will then be used to measure the carrier-phase. It is expected that reference devices, with a fixed known location, will also measure the phase on the CP-PRS in order to enable double differential measurements. FIG. 3 shows one possible expected system setup for carrier-phase positioning.

In FIG. 3, there is a serving gNB 170-1 that transmits CP-PRS 310-1, a second gNB 170-2 that transmits CP-PRS 310-2, and a third gNB 170-3 that transmits CP-PRS 310-3. The LMF/LMC 330 provides assistance data, including CP-PRS information, to the UEs 110-1 and 110-2, as indicated by respective references 340-1 and 340-2. The CP-PRS information provides details about the CP-PRS 310 for the gNBs 170 and allows the UEs 110 to receive those reference signals and make positioning measurements. In this example, the target UE 110-2 and the reference device 110-2 can receive CP-PRS 310-1, 310-2, and 310-3 from the corresponding gNBs 170-1, 170-2, and 170-3.

The target UE 110-1 is connected to the serving gNB 170-1 and reports positioning measurements to the serving gNB 170-1. There is a reference device 110-2 that reports positioning measurements to at least the gNB 170-3 in this example, and the gNB 170-3 sends carrier-phase information plus timing measurement reports to the LMF/LMC 330. The serving gNB 170-1 sends (see reference 320) carrier-phase information plus timing measurement reports to the LMF/LMC 330.

Figure 4:
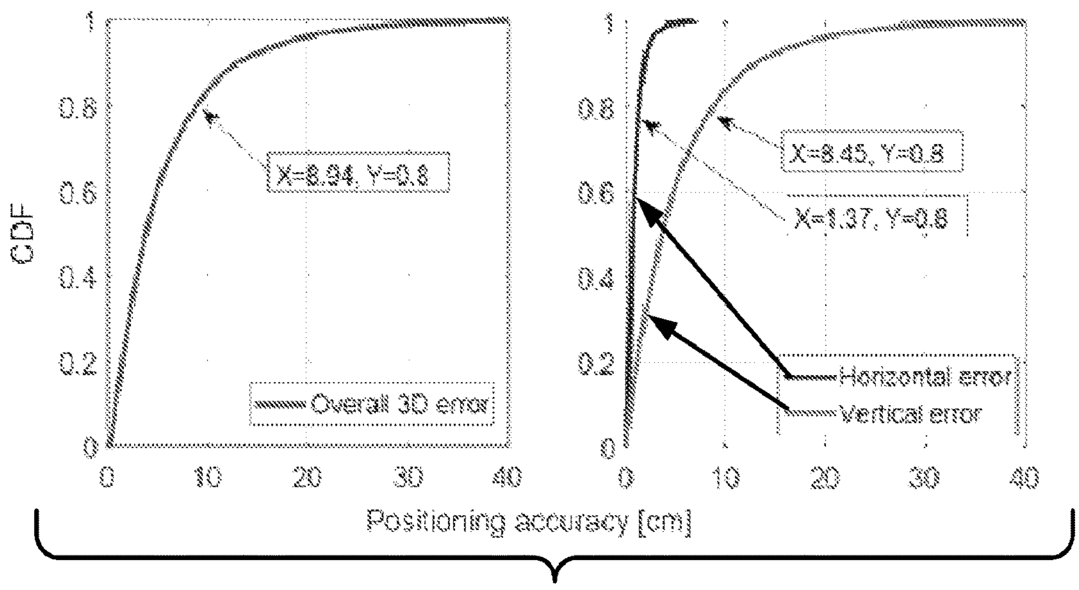
FIG. 4 is an example of graphs of positioning accuracy using a carrier-phase method.

Carrier-phase positioning is also able to provide 3D positioning rather than just 2D positioning. This is especially important for many IIoT use cases. The problem, however, is that 3D positioning is quite sensitive to error in the z-domain (i.e., vertical/height estimation). This is shown in the simulation results illustrated in FIG. 4. These simulation results were generated in a system-level simulator using the agreed-upon 3GPP scenario/channel model for the indoor factor-spare high (InF-SH) and the absolute time of arrival (ToA) model. The results show the potential of carrier-phase to provide accuracy well below the Rel-16/17 requirements.

Based on this figure, one can see that the z-domain (vertical estimation) can be much more sensitive to measurement errors than x/y-domain and therefore lead to high errors in the z-domain and the overall estimated 3D position. In particular, one can see that high accuracy can still be achieved in the x-y plane, i.e., horizontal accuracy (≈1.37 cm for 80% of the UEs) while the z-domain, i.e., vertical accuracy, has much larger errors (≈8.45 cm for 80% of the UEs).

There are existing methods for vertical positioning which use barometric pressure sensors. However, these methods are not close to accurate enough for advanced use cases in IIOT where even in Rel-17 there is a target of 0.5 m vertical error and this is expected to further improve in future NR releases. Furthermore, it is ideal to have a solution for the vertical error that is also based on NR RAT-dependent methods without depending on the external source of the UEs.

In this document, exemplary solutions are presented to mitigate the problem of large z-domain (i.e., vertical) errors in 3D positioning estimation for carrier-phase positioning. Although the proposed techniques are presented for carrier-phase positioning, the exemplary embodiments are not limited to carrier-phase positioning and can be applied to other positioning methods as well.

As an overview, one example herein proposes a bounded localization method for the location server (e.g., LMF) and UE to improve the vertical positioning estimation accuracy in, e.g., indoor-factory (InF) scenarios using the carrier-phase measurements. The exemplary embodiments apply to both of the following: a) a UE-based mode, where it assumes that a UE is capable of performing carrier-phase-based positioning locally; and b) a UE-assisted mode, where the LMF calculates the position estimation based on reported measurements. Exemplary steps are summarized here, and detailed embodiments are provided below. Consider the following possible operations in an example.

1) The UE uses CP-PRS to perform the carrier-phase measurements from the serving and neighboring gNBs.

2) In UE-assisted mode, the UE provides the LMF with localization side information about its use case, form factor, or other limitation(s) (e.g., which may be implemented via new signaling). In this document, localization side information denotes any additional information that the UE and LMF can provide each other with which to improve the vertical positioning estimation accuracy of the vertical position over which the UE may be positioned.

2-i) Some examples of the above localization side information include information about a UAV, which may be limited with a specific flying range in the factory, and/or information about a human or humanoid, which may be limited by the factory geometry or their geometry.

2-ii) In the case of a robot for example, the robot arms/parts may be physically constrained due to their size and the robot being on the floor.

2-iii) The localization side information would therefore inform the LMF of localization constraints in the z-domain. The localization constraints are constraints placed on the UE with respect to vertical operation such as limit(s) to how high or how low in the vertical domain (z-domain) to which the UE is or may be subjected. These could also be related to locations in an area, such as along a manufacturing floor, such that the localization constraints modify valid vertical ranges for different locations over the manufacturing floor.

3) In UE-based mode, the LMF provides the UE with localization side information based on the factory/environment geometry, physical limitations of the factory floor area, and/or past information (e.g., which may involve new signaling).

3-i) Some examples of the above localization side information are a factory which has a maximum ceiling height/floor height, shelve height, or other objects which block the UE from being in certain areas of the factory ceiling.

3-ii) The localization side information would therefore inform the UE of the localization constraints in the z-domain.

4) A positioning calculation entity (LMF in UE-assisted or UE in UE-based) uses the localization side information to add upper and lower boundaries to the estimated UE height.

5) The positioning calculation entity estimates the UE position using the known positions of the gNBs and the carrier-phase measurements, taking into account the upper/lower boundaries.

6) If the estimated UE height is out of the expected range, the positioning calculation entity takes some actions to improve the height estimation accuracy (which may be implemented, e.g., via new signaling). Some examples for these actions (which will be further discussed in detail below) include the following.

6-i) The LMF may request the UE to report positioning measurements for a different set of gNBs.

6-ii) The LMF may also request the UE to confirm if the boundary information is valid.

6-iii) Inform the positioning information consumer that the location in the z-domain is outside of the boundaries.

6-iv) The LMF may configure the UE to re-collect the carrier phase measurements from a set of gNBs that has a specific geometric property (e.g., the high variance between their elevation angles with the UE). Performance results show that the vertical positioning estimation is sensitive to the variance between the elevation angles.

6-v) The LMF may configure the UE to use a specific gNB selection method, e.g., to collect the carrier-phase measurements from the only gNBs with high line-of-sight (LoS) probability.

6-vi) The LMF can try to perform a localization algorithm with different initial guess about the UE's location.

6-vii) The UE can also provide the LMF with (initial guess, boundary information, valid time) so that LMF can use this information in order to estimate the UE's location, based on initial guess and boundary information within the valid time. That is, within the valid time, the UE's location is bounded by the specific range. For example, the boundary information can be the specific floor number of a building or specific z-axis (where the z-axis can be estimated from UE's barometric sensor as one example).

6-viii) The UE may request different reference signal configuration or configurations for different or additional set or sets of TRPs or reference signal resources.

6-ix) In UE-based mode, UE may request the LMF to perform the location estimation.

Now that an overview has been provided, additional implementation examples are provided. As discussed above, exemplary preliminary results show that the 3D positioning estimation is sensitive to the positioning measurement estimation accuracy. A small measurement error may lead to a significant positioning estimation error. Statistics from system-level simulations show that these high errors are coming from the estimated position vertical component (i.e., z-domain).

Figure 5:
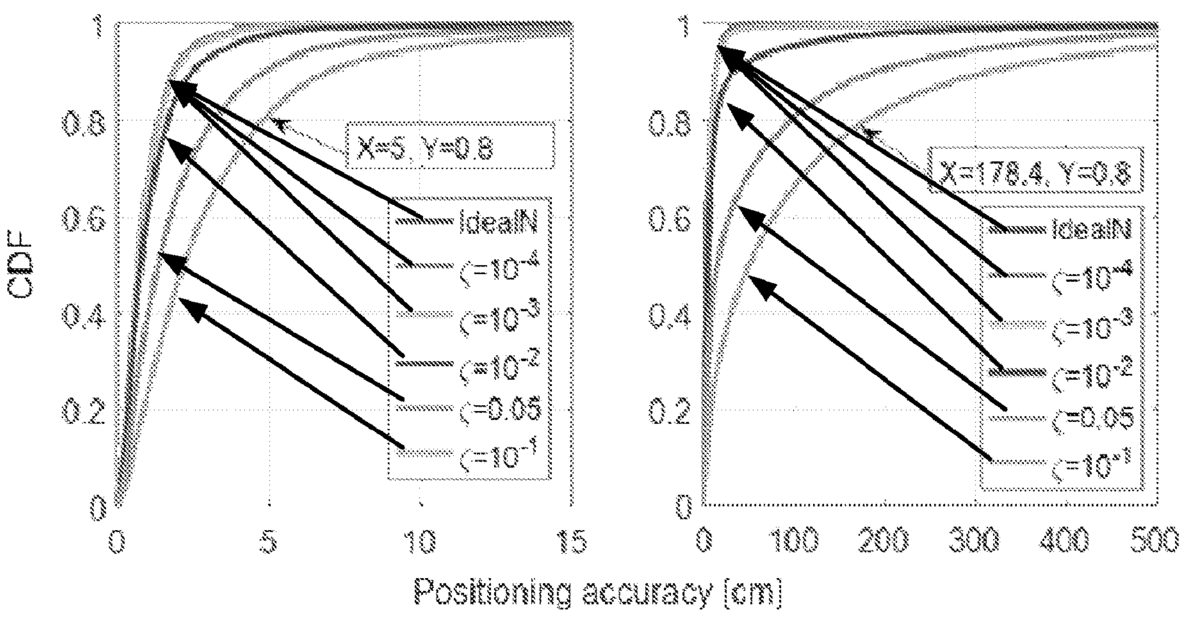
FIG. 5 illustrates sensitivity of horizontal positioning (FIG. 5(*a*)) and vertical positioning (FIG. 5(*b*)) to the integer ambiguity errors.

In particular, FIG. 5 shows the sensitivity of the horizontal accuracy (FIG. 5(*a*) and vertical accuracy (FIG. 5(*b*) to the integer ambiguity errors in the carrier-phase measurements. Integer ambiguity is the unknown integer number of complete phase cycles that a reference signal has traveled between gNB/UE to produce exactly the same observed phase measurement at the UE. As shown in FIG. 5, the horizontal and vertical accuracies degrade as the probability of incorrect integer ambiguity fixing (i.e., ¿) increases. The horizontal accuracy degrades from 1.37 to 5 cm (factor of ~3.6) for 80% of the UEs, while the vertical accuracy degrades from 8.45 to 178.4 cm (factor of ~21) for 80% of the UEs. This confirms the sensitivity of the vertical estimation accuracy to the position measurement error and shows that the error can grow very large (i.e., multiple meters or more). This further shows the importance of solving the problem previously described above.

While these results are shown for carrier-phase-based positioning, the same trend is observed in other techniques (e.g., DL-TDOA) and the exemplary embodiments also apply to those techniques. Exemplary embodiments herein aim to use some localization side information (that is, knowledge about the UE, factory or other environment information) such that the exemplary techniques can mitigate the problem shown in FIG. 5.

To address at least the described issues, a bounded localization method is proposed as one example herein to bound the upper and lower limits of the estimated UE height based on the deployment scenario or other localization side information. New signaling between the UE and LMF may be used to enable the proposed bounded localization method. In UE-assisted mode, a UE provides the LMF with information about its use case which can be utilized (e.g., along with the information about the geometry of a deployment scenario) to find the upper and lower limits of the estimated UE height to improve the estimation accuracy. In UE-based mode, the LMF provides the UE with information about the geometry of the deployment scenario which can be utilized (along with the use case-specific information at the UE) to improve the accuracy. It is expected that vertical estimation accuracy (and consequently the overall 3D positioning accuracy) can be significantly improved by finding adequate boundaries for the estimated UE height. Appropriate actions can be taken by the UE/LMF when the height is found to be outside the expected range. Different possible actions are described below. These are described as LMF behaviors but they also apply to the UE if the UE is the one performing the positioning calculation.

Figure 6:
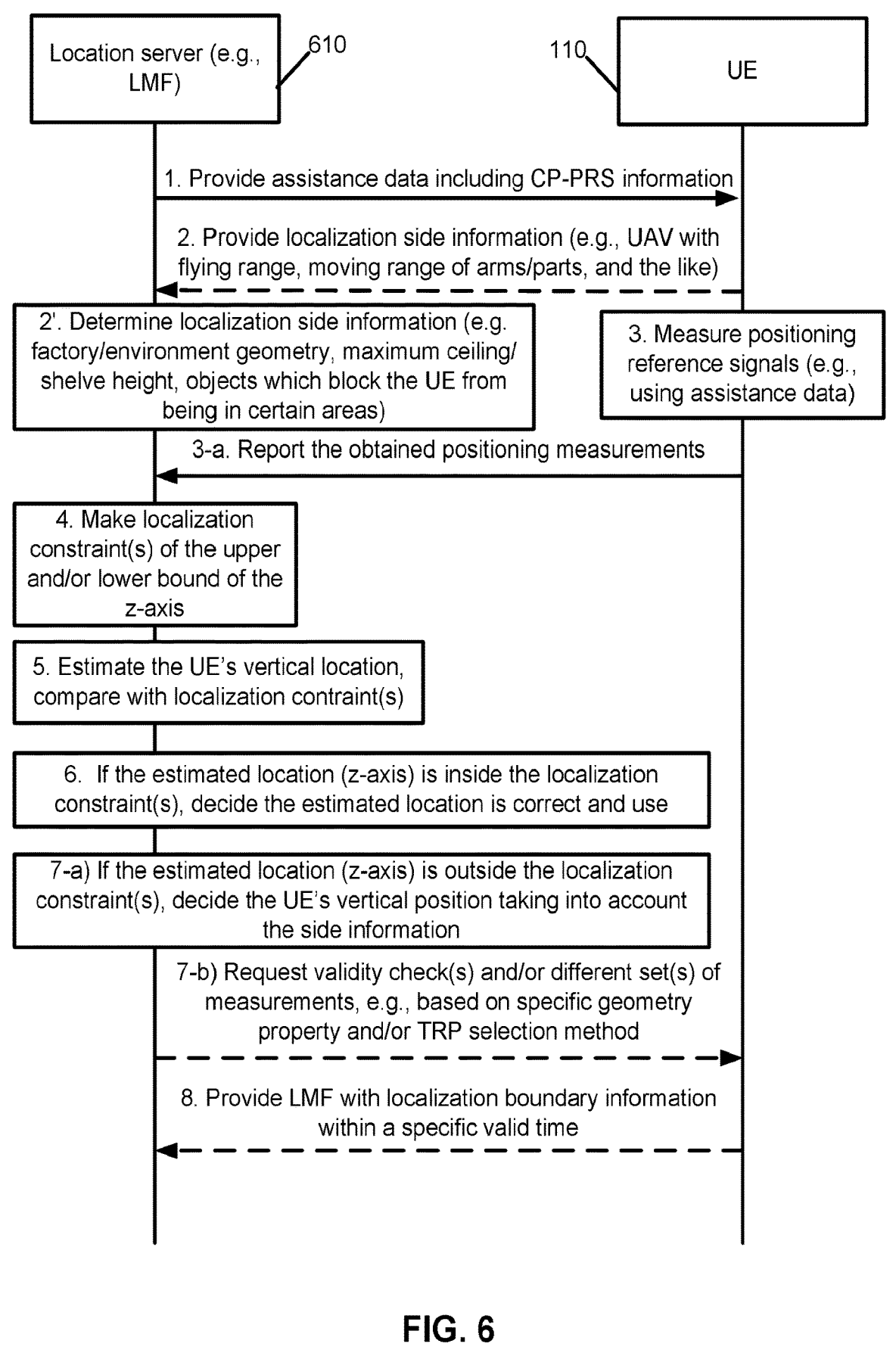

FIG. 6 shows the overall procedures of an example herein for UE-assisted mode where the LMF performs the estimated vertical location determination. This figure is a logic flow diagram for vertical positioning error reduction in, e.g., IIoT. This figure also illustrates the operation of an exemplary method, a result of execution of computer program instructions embodied on a computer readable memory, functions performed by logic implemented in hardware, and/or interconnected means for performing functions in accordance with exemplary embodiments. The UE 110 performs the operations in FIG. 6 under control of the control module 140, while the location server (e.g., LMF) 610 in this example is one of the network elements 190 and performs its operations under control of a corresponding control module 184. During the description below for FIG. 6, reference may also be made to FIG. 3.

In step 1, the LMF 610 provides assistance data including CP-PRS information to the UE 110. The connection between LMF and the UE can be performed by, e.g., LPP signaling. See 3GPP TS 37.355 V16.6.0 (2021 Setptember). At first, the LMF provides the UE with assistance data which includes information for the UE to measure positioning reference signals and report the obtained positioning measurements. The CP-PRS information, for instance, may include CP-PRS resources (e.g., resource identifications and configurations) for the gNBs 170-1, 170-2, and/or 170-3 in FIG. 3.

The UE 110 in step 2 provides localization side information such as indication of a UAV with a flying range indicated, a moving range of robot arms/parts, and the like. Other information is possible, such as factory/environment geometry, maximum ceiling/shelve height, objects which block the UE from being in certain areas, or any other information that places one or more limits on the vertical range. That is, the localization side information may place limit(s) on an expected vertical range for the UE 110. Step 2 is dashed, as are steps 7-*b* and 8, which are described below. The dashing of these steps indicates signaling that may be useful to implement the exemplary embodiments and that are not currently implemented.

The UE in step 3 measures positioning reference signals, e.g., CP-PRS. This may use the assistance data received in step 1. The UE 110 reports in step 3-*a* the obtained positioning measurements. For the example of FIG. 3, this might be measurements based on at least the gNB 170-1, and may also include measurements based on the gNBs 170-2, and/or 170-3.

The LMF 610 in step 4 makes localization constraint(s) of the upper and/or lower bound of the z-axes. In step 5, the LMF 610 estimates the UE's location, e.g., based at least on the positioning measurements reported in step 4.

If the estimated vertical location (z-axis) is inside the localization constraint(s), the LMF 610 performs step 6, and decides that the estimated location is correct. The LMF 610 uses the estimated location for processes that are known, such as repositioning the UE, allowing the UE to continue along its current path, or the like.

If the estimated vertical position is outside of the localization constraint(s), the LMF 610 performs step 7. Step 7 may be divided into one or both of steps 7-*a* and 7-*b*. In step 7-*a* the LMF 610 recalculates the UE's vertical position based on the received localization side information from the UE as provided in step 2 and its own generated localization side information (e.g., if there is any). For instance, if the UE has indicated the UAV has a vertical limit on its flying range, and the estimated vertical position is outside that vertical limit, the vertical limit might be used instead of the vertical position.

In step 7-*b*, the LMF 610 may request a validity check and/or may request a different set of measurements from the UE, e.g., based on specific geometry property and/or TRP selection method. An example for the specific geometry property is the high variance between the elevation angles of different TRPs with the UE. Performance results show that the vertical positioning estimation is sensitive to the variance between the elevation angles. An example for a specific TRP selection method is to collect the carrier-phase measurements (or the positioning measurements in general) from the only gNBs with high line-of-sight (LoS) probability.

The validity check is a request made by the LMF to the UE to confirm if the localization boundary information is valid. The different set of measurements means that if the UE had reported measurements of TRPs #1/#2/#3 (e.g., TRPs 170-1, 710-2, 170-3 in FIG. 3), the LMF may request the UE to report the measurements of TRPs #4/#5/#6. Depending on the outcomes, either step 6 or 7-*a* and/or step 7-*b* may be performed again responsive to step 7-*b*.

In step 8, the UE provides the LMF with localization boundary information within a specific valid time, in an exemplary embodiment. It is noted that boundary information and localization boundary information are considered to be the same herein.

What has been described so far with respect to FIG. 6 is a UE-assisted process (i.e., the LMF calculates the position), where UE provides some localization side information to LMF. It is also possible for this UE-assisted process that the LMF determines the localization side information locally. This is illustrated by step 2', where the LMF 610 determines localization side information (e.g., factory/environment geometry, maximum ceiling/shelve height, objects which block the UE from being in certain areas, or any other information that places one or more limits on the vertical range). Step 2' could be used in addition to step 2, as another enhancement layer used to improve the estimated accuracy. The UE may also have information that overrides that, such as the UE determining its maximum height (e.g., less that the area's maximum height) and send that in addition to the determination from step 2'.

FIG. 7 shows the overall procedures of an example herein for UE-assisted mode where the UE performs the estimated vertical location determination. This figure is a logic flow diagram for vertical positioning error reduction in, e.g., IIoT. This figure also illustrates the operation of an exemplary method, a result of execution of computer program instructions embodied on a computer readable memory, functions performed by logic implemented in hardware, and/or interconnected means for performing functions in accordance with exemplary embodiments. The UE 110 performs the operations in FIG. 7 under control of the control module 140, while the location server (e.g., LMF) 610 in this example is one of the network elements 190 and performs its operations under control of a corresponding control module 184. Reference may also be made to FIG. 3. Many of the steps in FIG. 7 are similar to the steps in FIG. 6, and therefore only a brief mention will be made here for these steps.

Step 1 is similar to step 1 in FIG. 6, and the LMF 610 provides assistance data including CP-PRS information. In step 2, and as previously described, other localization side information can be provided by the LMF to the UE, such as factory/environment geometry, maximum ceiling/shelve height, objects which block the UE from being in certain areas, or any other information that places one or more limits on the vertical range. Step 2' has the UE 110 determining localization side information such as indication of a UAV with a flying range indicated, a moving range of robot arms/parts, and the like. Consequently, the localization side information may place limit(s) on an expected vertical range for the UE 110. Step 2' could be used in addition to step 2, as another enhancement layer used to improve the estimated accuracy. Step 2 is dashed, as is steps 7-*b* and 8, which are described below. The dashing of these steps indicates signaling that may be useful to implement the exemplary embodiments and that are not currently implemented.

Step 3 is the same as step 3 of FIG. 6. However, in FIG. 7, the UE 110 does not report the measured positioning reference signals. The UE only measures the positioning reference signals and uses a locally implemented positioning method to calculate its estimated position. In step 4, the UE 110 makes localization constraint(s) of the upper and/or lower bound of the z-axis. In step 5, the UE 110 estimates its vertical location. If the estimated vertical location (z-axis) is inside the localization constraint(s), the UE performs step 6 and decides that the estimated vertical location is correct.

If the estimated vertical location (z-axis) is outside the localization constraint(s), the UE performs step 7 and recalculates the UE's vertical position taking into account the received localization side information from the LMF and its own localization side information.

As illustrated above, steps 4 to 7-*a* in FIG. 7 are similar to those same steps in FIG. 6, but performed by the UE 110 instead of the LMF 610. Step 7-*b* in FIG. 7 is different from step 7-*b* in FIG. 6. For step 7-*b* in FIG. 7, the UE may request different PRS configuration(s) for the different/additional set(s) of TRPs and/or PRS resources, or request the LMF to perform the location estimation. By "different", it is meant from the current configuration. For example, the UE has current PRS configuration(s) for current set(s) of TRPs, and the different PRS configurations would be different from the current PRS configuration(s), with (typically, though not always) different TRP(s).

In step 8, the UE 110 uses and/or provides the LMF 610 with localization boundary information within a specific valid time to modify the estimated UE's vertical location. Step 8 involves operations performed by the UE, and also may involve signaling that may help to implement exemplary embodiments. Because step 8 may involve this signaling, e.g., by providing the LMF 610 with the boundary information, step 8 uses a dashed line.

Boundary information regarding movable UEs such as a drone, which must fly a certain distance below the ceiling of a factory for instance, can help to fine-tune the estimated UE vertical location. The UE could also send the location to the LMF as an option for signaling.

For this UE-based positioning process (i.e., UE calculates the position), it is also possible that the LMF provides some localization side information to the UE. See Step 2, where localization side information is provided from the location server 610 to the UE 110. Step 2 could be instead of step 2' or in addition to step 2'. For example, the location server 610 may have data about the building in which the UE (e.g., a movable robot) resides, and the flow could use step 2 instead of step 2' to indicate the height of the ceiling in the building. As another example, the UE could have limits that are less than the height and both steps 2' and 2 could be used.

In this document, what has been provided are solutions for, e.g., Indoor Factory (InF) and other industrial use cases where the environment lends itself to such solutions. The exemplary embodiments are meant to apply to IIoT use cases, although other use cases are possible. Methods have been described above, e.g., to add new signaling to these IIoT use cases in order to limit the z-axis (i.e., vertical) positioning estimation error.

Additional exemplary LMF behaviors are as follows.

If the estimated UE height is out of the expected range in LMF-based positioning, the LMF may configure the UE to perform carrier-phase-based positioning using methods, e.g., described above with respect to operation (6).

Figure 8:
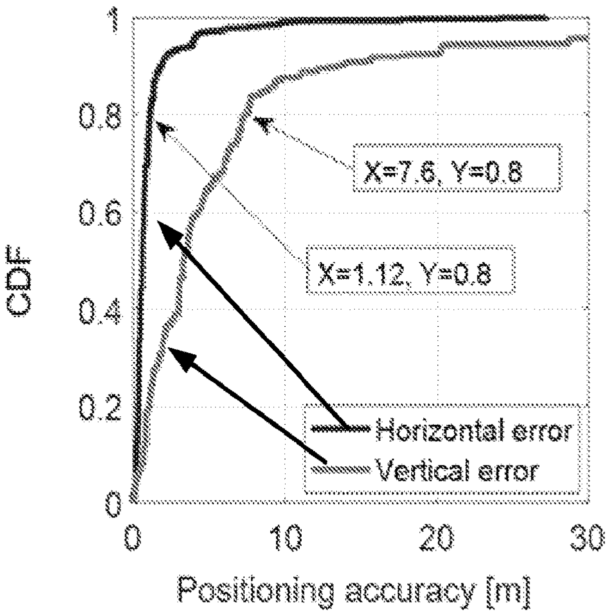
FIG. 8 is a graph illustrating positioning accuracy using a DL-TDOA method.

Note while the above methods are described for carrier-phase-based positioning, these could also apply to DL-TDOA or other future positioning methods in NR. FIG. 8 is a graph illustrating positioning accuracy using a DL-TDOA method, and shows the sensitivity of the vertical accuracy to the measurement errors where the vertical error is much larger than the horizontal error. The techniques described herein can improve this too.

The exemplary embodiments also apply to UL, and DL and UL, methods as well. In the case of UL methods, the signaling may also need to be implemented in the New Radio Positioning Protocol a (NRPPa).

Figure 9:
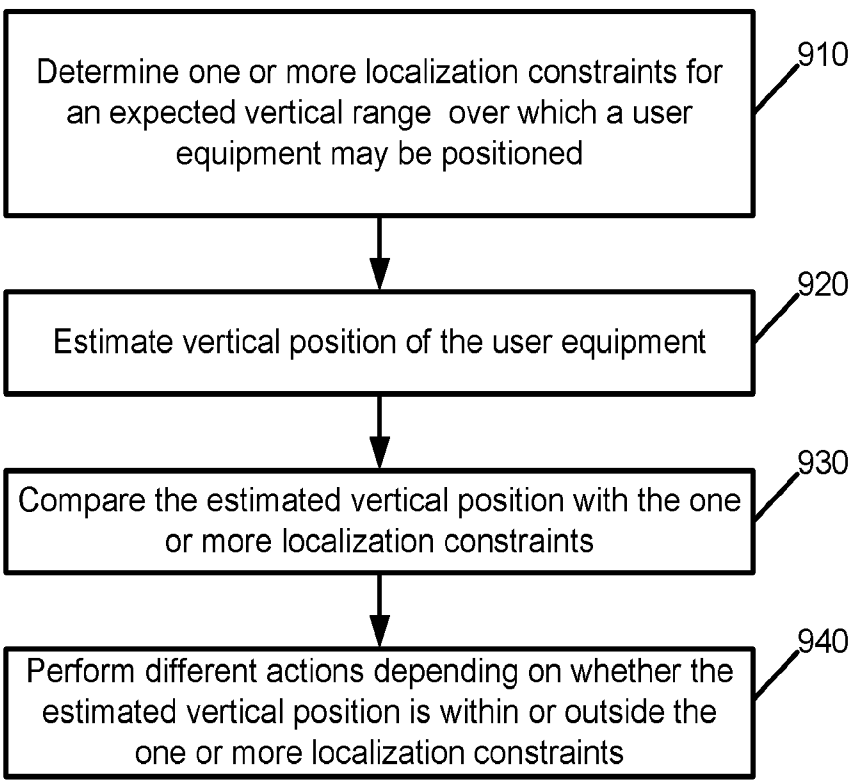
FIG. 9 is a logic flow diagram for vertical positioning error reduction, and illustrates the operation of an exemplary method, a result of execution of computer program instructions embodied on a computer readable memory, functions performed by logic implemented in hardware, and/or interconnected means for performing functions in accordance with an exemplary embodiment.

Turning to FIG. 9, this figure is a logic flow diagram for vertical positioning error reduction. This figure illustrates the operation of an exemplary method, a result of execution of computer program instructions embodied on a computer readable memory, functions performed by logic implemented in hardware, and/or interconnected means for performing functions in accordance with an exemplary embodiment. The operations in FIG. 9 may be performed by a UE 110, under control of its control module 140, or by a location server 190, under control of its control module 184, or even by an LMC 80 as implemented by the RAN node 170. For ease of reference, the entity covering these (and potentially other) options is referred to as a network device.

In block 910, the network device determines one or more localization constraints for an expected vertical range over which a user equipment may be positioned. In block 920, the network device estimates vertical position of the user equipment. The network device compares the estimated vertical position with the one or more localization constraints in block 930. In block 920, the network device performs different actions depending on whether the estimated vertical position is within or outside the one or more localization constraints.

In the following examples, the method of FIG. 1 is referred to as example 1.

Example 2. The method of example 1, wherein the one or more localization constraints are based on localization side information comprising both or one of an upper bound or a lower bound of the expected vertical range for the user equipment.

Example 3. The method of example 1 or 2, wherein performing different actions comprises performing one of setting a determined vertical position as the estimated vertical position in response to the estimated vertical position being within the localization constraints or performing one or more actions in response to the estimated vertical position being outside the one or more localization constraints.

Example 4. The method of example 3, wherein setting the determined vertical position comprises:

setting the determined vertical position to be a value based on and within a range of values limited by both or one of upper and lower localization constraints.

Example 5. The method of example 3, performed by a location server, wherein:

the method further comprises receiving by the location server positioning measurements from the user equipment and receiving by the location server localization side information from the user equipment that defines both or one of upper and lower localization constraints of the expected vertical range for the user equipment;

the determining the one or more localization constraints comprises estimating both or one of the vertical localization constraints using the received localization side information; and the method further comprises performing a validity check for both or one of the localization constraints by the location server or requesting, by the location server from the user equipment, one or more sets of position measurements different from the received positioning measurements.

Example 6. The method of either example 2 or 5, wherein in response to the estimated vertical position being out of the expected vertical range, configuring by the location server the user equipment to perform a positioning technique using one or more of the following methods:

1) configuring the user equipment to re-collect the positioning measurements from a set of base stations that have a specific geometric property;
2) bounding the determined vertical position based on the localization side information provided by the user equipment;
3) performing a localization algorithm with different initial guesses about the vertical location of the user equipment.
4) requesting the user equipment to report positioning measurements for a different set of base stations;
5) requesting the user equipment to confirm whether the boundary information is valid; or
6) configuring the user equipment to use a specific selection method to select base stations from which to collect the positioning measurements.

Example 7. The method of example 6, wherein the positioning technique comprises carrier-phase-based positioning.

Example 8. The method of one of examples 4 to 7, wherein the method further comprises:

receiving, by the location server and from the user equipment, information comprising an initial guess, boundary information, and a valid time; and using by the location server the information in order to estimate the vertical location based on the initial guess and boundary information within the valid time.

Example 9. The method of example 3, performed by a location server, wherein:

the method further comprises performing by the user equipment positioning measurements;

the estimation of the user equipment position is performed using the positioning measurements; and the method further comprises performing either requesting by the user equipment the location server to perform the location estimation or requesting by the user equipment from the location server both or one of one or more different reference signal configurations and/or resources for one or more different or additional set or sets of base stations.

Example 10. The method of any one of examples 1 to 8, performed by a location server, wherein at least part of the localization side information is received by the location server from the user equipment.

Example 11. The method of any one of examples 1 to 4 or 9, performed by the user equipment, wherein at least part of the localization side information is received by the user equipment from a location server.

Example 12. A computer program, comprising code for performing the methods of any of examples 1 to 11, when the computer program is run on a computer.

Example 13. The computer program according to example 12, wherein the computer program is a computer program product comprising a computer-readable medium bearing computer program code embodied therein for use with the computer.

Example 14. The computer program according to example 12, wherein the computer program is directly loadable into an internal memory of the computer.

Example 15. An apparatus comprising means for performing:

determining one or more localization constraints for an expected vertical range over which a user equipment may be positioned;

estimating vertical position of the user equipment;

comparing the estimated vertical position with the one or more localization constraints; and performing different actions depending on whether the estimated vertical position is within or outside the one or more localization constraints.

Example 16. The apparatus of example 15, wherein the one or more localization constraints are based on localization side information comprising both or one of an upper bound or a lower bound of the expected vertical range for the user equipment.

Example 17. The apparatus of example 15 or 16, wherein performing different actions comprises performing one of setting a determined vertical position as the estimated vertical position in response to the estimated vertical position being within the localization constraints or performing one or more actions in response to the estimated vertical position being outside the one or more localization constraints.

Example 18. The apparatus of example 17, wherein setting the determined vertical position comprises:

setting the determined vertical position to be a value based on and within a range of values limited by both or one of upper and lower localization constraints.

Example 19. The apparatus of example 17, performed by a location server, wherein:

the means are further configured to perform: receiving by the location server positioning measurements from the user equipment and receiving by the location server localization side information from the user equipment that defines both or one of upper and lower localization constraints of the expected vertical range for the user equipment;

the determining the one or more localization constraints comprises estimating both or one of the vertical localization constraints using the received localization side information; and the means are further configured to perform: performing a validity check for both or one of the localization constraints by the location server or requesting, by the location server from the user equipment, one or more sets of position measurements different from the received positioning measurements.

Example 20. The apparatus of either example 16 or 19, wherein in response to the estimated vertical position being out of the expected vertical range, configuring by the location server the user equipment to perform a positioning technique using one or more of the following:

1) configuring the user equipment to re-collect the positioning measurements from a set of base stations that have a specific geometric property;
2) bounding the determined vertical position based on the localization side information provided by the user equipment;
3) performing a localization algorithm with different initial guesses about the vertical location of the user equipment.
4) requesting the user equipment to report positioning measurements for a different set of base stations;
5) requesting the user equipment to confirm whether the boundary information is valid; or
6) configuring the user equipment to use a specific selection method to select base stations from which to collect the positioning measurements.

Example 21. The apparatus of example 20, wherein the positioning technique comprises carrier-phase-based positioning.

Example 22. The apparatus of one of examples 18 to 21, wherein the means are further configured to perform:

receiving, by the location server and from the user equipment, information comprising an initial guess, boundary information, and a valid time; and using by the location server the information in order to estimate the vertical location based on the initial guess and boundary information within the valid time.

Example 23. The apparatus of example 17, performed by a location server, wherein:

the means are further configured to perform: performing by the user equipment positioning measurements;

the estimation of the user equipment position is performed using the positioning measurements; and the means are further configured to perform: performing either requesting by the user equipment the location server to perform the location estimation or requesting by the user equipment from the location server both or one of one or more different reference signal configurations and/or resources for one or more different or additional set or sets of base stations.

Example 24. The apparatus of any one of examples 15 to 22, performed by a location server, wherein at least part of the localization side information is received by the location server from the user equipment.

Example 25. The apparatus of any one of examples 15 to 18 or 23, performed by the user equipment, wherein at least part of the localization side information is received by the user equipment from a location server.

Example 26. The apparatus of any preceding apparatus example, wherein the means comprises:

at least one processor; and at least one memory including computer program code, the at least one memory and computer program code configured to, with the at least one processor, cause the performance of the apparatus.

Example 27. An apparatus, comprising:

one or more processors; and one or more memories including computer program code, wherein the one or more memories and the computer program code are configured, with the one or more processors, to cause the apparatus to:

determine one or more localization constraints for an expected vertical range over which a user equipment may be positioned;

estimate vertical position of the user equipment;

compare the estimated vertical position with the one or more localization constraints; and perform different actions depending on whether the estimated vertical position is within or outside the one or more localization constraints.

Example 28. A computer program product comprising a computer-readable storage medium bearing computer program code embodied therein for use with a computer, the computer program code comprising:

code for determining one or more localization constraints for an expected vertical range over which a user equipment may be positioned;

code for estimating vertical position of the user equipment;

code for comparing the estimated vertical position with the one or more localization constraints; and code for performing different actions depending on whether the estimated vertical position is within or outside the one or more localization constraints.

Without in any way limiting the scope, interpretation, or application of the claims appearing below, a technical effect of one or more of the example embodiments disclosed herein is higher accuracy with vertical (i.e., z-domain) positioning. Another technical effect of one or more of the example embodiments disclosed herein is higher overall 3-D positioning accuracy.

As used in this application, the term "circuitry" may refer to one or more or all of the following:

(a) hardware-only circuit implementations (such as implementations in only analog and/or digital circuitry) and (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation."

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Embodiments herein may be implemented in software (executed by one or more processors), hardware (e.g., an application specific integrated circuit), or a combination of software and hardware. In an example embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 1. A computer-readable medium may comprise a computer-readable storage medium (e.g., memories 125, 155, 171 or other device) that may be any media or means that can contain, store, and/or transport the instructions for use by or in connection with an instruction execution system, apparatus, or device, such as a computer. A computer-readable storage medium does not comprise propagating signals.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

The following abbreviations that may be found in the specification and/or the drawing figures are defined as follows:

2D two-dimensional
3D three-dimensional
3GPP third generation partnership project
5G fifth generation
5GC 5G core network
AMF access and mobility management function
CDF cumulative distribution function
CP carrier phase
CP-PRS carrier-phase-positioning reference signals
CU central unit
DU distributed unit
evolved Node B (e.g., an LTE base station)
eNB (or eNodeB)
EN-DC E-UTRA-NR dual connectivity
en-gNB or En-gNB node providing NR user plane and control plane protocol terminations towards the UE, and acting as secondary node in EN-DC
E-UTRA evolved universal terrestrial radio access, i.e., the LTE radio access technology
gNB (or gNodeB) base station for 5G/NR, i.e., a node providing NR user plane and control plane protocol terminations towards the UE, and connected via the NG interface to the 5GC
GNNS Global Navigation Satellite System
I/F interface
InF indoor-factor
IoT Internet of things
IIoT Industrial IoT
LMC location management component
LMF location management function
LPP LTE positioning protocol
LTE long term evolution
MAC medium access control
MME mobility management entity
ng or NG next generation
ng-eNB or NG-eNB next generation eNB
NR new radio
N/W or NW network
PDCP packet data convergence protocol
PHY physical layer
PRS positioning reference signal
RAN radio access network
Rel release
RLC radio link control
RRH remote radio head
RRC radio resource control
RTK real-time kinematic
RU radio unit
Rx receiver
SDAP service data adaptation protocol
SGW serving gateway
SMF session management function
SRS sounding reference signals
TDOA time difference on arrival
TRP transmission-reception point
TS technical specification
Tx transmitter
UAV unmanned aerial vehicle
UE user equipment (e.g., a wireless, typically mobile device)
UPF user plane function

What is claimed is:

1. A device comprising:
a processor; and
a non-transitory computer-readable medium comprising computer-executable instructions that, when executed by the processor, cause the device to perform the following operations:
receiving, by a location server, positioning measurements from a user equipment,
receiving, by the location server, localization side information from the user equipment that defines both upper and lower localization constraints of an expected vertical range for the user equipment;
determining localization constraints for an expected vertical range over which the user equipment may be positioned by estimating vertical localization constraints using the received localization side information;
receiving, by the location server and from the user equipment, information comprising an initial guess, boundary information, and a valid time;
using, by the location server, the information in order to estimate a vertical position of the user equipment based on the initial guess and boundary information within the valid time and the localization constraints;
determining the estimated vertical position is out of an expected vertical range based on the one or more localization restraints; and
in response to the estimated vertical position being out of the expected vertical range:
configuring the user equipment to re-collect the positioning measurements from a set of base stations that have a specific geometric property;
bounding the determined vertical position based on the localization side information provided by the user equipment;
performing a localization algorithm with different initial guesses about the vertical location of the user equipment;
requesting the user equipment to report positioning measurements for a different set of base stations;
requesting the user equipment to confirm whether the boundary information is valid; and
configuring the user equipment to use a specific selection method to select base stations from which to collect the positioning measurements.

2. The device of claim 1, wherein estimating the vertical position utilizes carrier-phase-based positioning.

3. The device of claim 2, wherein the estimation of the position of the user equipment is performed using positioning measurements performed by the user equipment.

4. The device of claim 3, wherein the computer-executable instructions further cause the device to perform the following operations:
receiving, from the user equipment, a request to perform location estimation.

5. The device of claim 4, wherein the computer-executable instructions further cause the device to perform the following operations:
performing different actions depending on whether the estimated vertical position of the user equipment is within or outside the localization constraints.

6. The device of claim 5, wherein performing different actions comprises:
setting a determined vertical position as the estimated vertical position in response to an estimated vertical position being within the localization constraints.

7. The device of claim 6, wherein performing different actions further comprises:

receiving one or more different reference signal configurations and resources for different or additional sets of base stations.

8. A system comprising:

a device;

a processor; and a non-transitory computer-readable medium comprising computer-executable instructions that, when executed by the processor, cause the device to perform the following operations:

receiving, by a location server, positioning measurements from a user equipment, receiving, by the location server, localization side information from the user equipment that defines both upper and lower localization constraints of an expected vertical range for the user equipment;

determining localization constraints for an expected vertical range over which the user equipment may be positioned by estimating vertical localization constraints using the received localization side information;

receiving, by the location server and from the user equipment, information comprising an initial guess, boundary information, and a valid time;

using, by the location server, the information in order to estimate a vertical position of the user equipment based on the initial guess and boundary information within the valid time and the localization constraints;

determining the estimated vertical position is out of an expected vertical range based on the one or more localization restraints; and in response to the estimated vertical position being out of the expected vertical range:

configuring the user equipment to re-collect the positioning measurements from a set of base stations that have a specific geometric property;

bounding the determined vertical position based on the localization side information provided by the user equipment;

performing a localization algorithm with different initial guesses about the vertical location of the user equipment;

requesting the user equipment to report positioning measurements for a different set of base stations;

requesting the user equipment to confirm whether the boundary information is valid; and configuring the user equipment to use a specific selection method to select base stations from which to collect the positioning measurements.

9. The system of claim 8, wherein estimating the vertical position utilizes carrier-phase-based positioning.

10. The system of claim 9, wherein the estimation of the position of the user equipment is performed using positioning measurements performed by the user equipment.

11. The system of claim 10, wherein the computer-executable instructions further cause the device to perform the following operations:

receiving, from the user equipment, a request to perform location estimation.

12. The system of claim 11, wherein the computer-executable instructions further cause the device to perform the following operations:

performing different actions depending on whether the estimated vertical position of the user equipment is within or outside the localization constraints.

13. The system of claim 12, wherein performing different actions comprises:

setting a determined vertical position as the estimated vertical position in response to an estimated vertical position being within the localization constraints.

14. The system of claim 13, wherein performing different actions further comprises:

receiving one or more different reference signal configurations and resources for different or additional sets of base stations.

15. A method comprising:

receiving, by a location server, positioning measurements from a user equipment, receiving, by the location server, localization side information from the user equipment that defines both upper and lower localization constraints of an expected vertical range for the user equipment;

determining localization constraints for an expected vertical range over which the user equipment may be positioned by estimating vertical localization constraints using the received localization side information;

receiving, by the location server and from the user equipment, information comprising an initial guess, boundary information, and a valid time;

using, by the location server, the information in order to estimate a vertical position of the user equipment based on the initial guess and boundary information within the valid time and the localization constraints;

determining the estimated vertical position is out of an expected vertical range based on the one or more localization restraints; and in response to the estimated vertical position being out of the expected vertical range:

configuring the user equipment to re-collect the positioning measurements from a set of base stations that have a specific geometric property;

bounding the determined vertical position based on the localization side information provided by the user equipment;

performing a localization algorithm with different initial guesses about the vertical location of the user equipment;

requesting the user equipment to report positioning measurements for a different set of base stations;

requesting the user equipment to confirm whether the boundary information is valid; and configuring the user equipment to use a specific selection method to select base stations from which to collect the positioning measurements.

16. The method of claim 15, wherein estimating the vertical position utilizes carrier-phase-based positioning.

17. The method of claim 16, wherein the estimation of the position of the user equipment is performed using positioning measurements performed by the user equipment.

18. The method of claim 17, further comprising:

receiving, from the user equipment, a request to perform location estimation.

19. The method of claim 18, further comprising:

performing different actions depending on whether the estimated vertical position of the user equipment is within or outside the localization constraints.

20. The method of claim 19, wherein performing different actions comprises:

setting a determined vertical position as the estimated vertical position in response to an estimated vertical position being within the localization constraints.

* * * * *